N. STATHAM.
PROCESS OF MAKING LIGHT PRECIPITATED CHALK.
APPLICATION FILED JULY 25, 1917.
1,266,339.
Patented May 14, 1918.
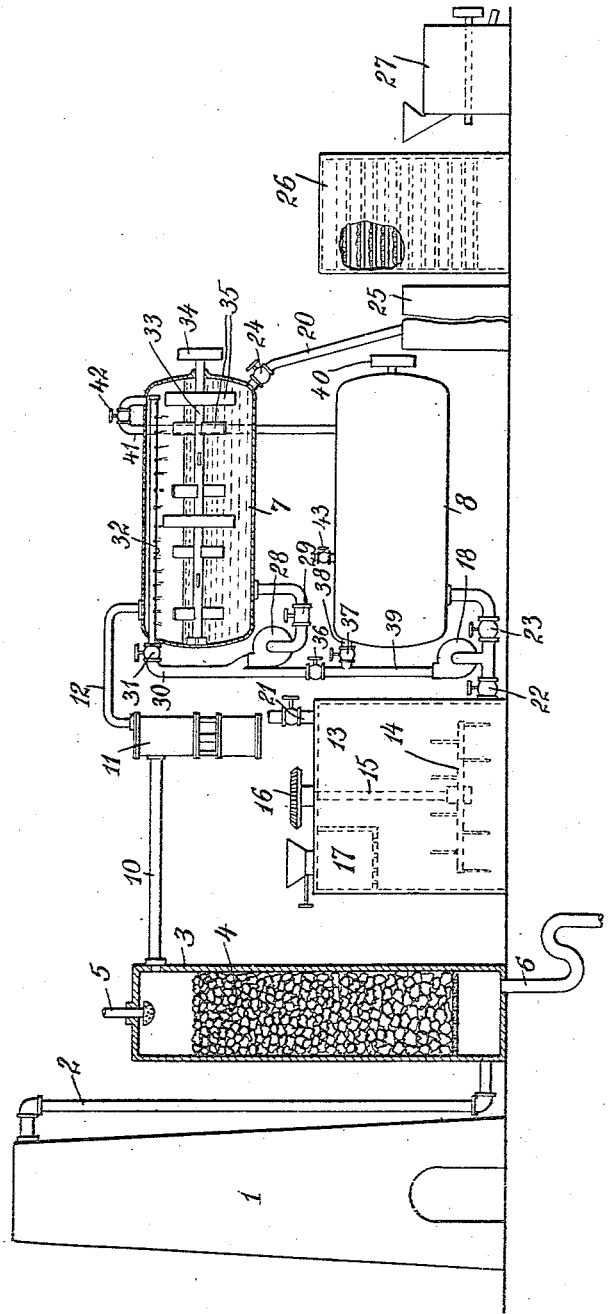
Inventor
Noel Statham
By his Attorney
Harry L. Duncan

UNITED STATES PATENT OFFICE.

NOEL STATHAM, OF HASTINGS-UPON-HUDSON, NEW YORK, ASSIGNOR TO INDUSTRIAL CHEMICAL COMPANY, OF NEW YORK, N. Y., A CORPORATION OF NEW YORK.

PROCESS OF MAKING LIGHT PRECIPITATED CHALK.

1,266,339.  Specification of Letters Patent.  Patented May 14, 1918.

Application filed July 25, 1917. Serial No. 182,599.

*To all whom it may concern:*

Be it known that I, NOEL STATHAM, a subject of the King of Great Britain, formerly residing at Yonkers, Westchester county, New York, and now residing at Hastings-upon-Hudson, Westchester county, New York, have made a certain new and useful Invention Relating to Processes of Making Light Precipitated Chalk, of which the following is a specification taken in connection with the accompanying drawing, which forms part of the same.

This invention is based on my United States Patent No. 1,178,962, of April 11, 1916, which broadly covers the light precipitated chalk described in this case. Precipitated chalk can of course be produced by the methods described in said patent so as to be lighter than 16 pounds per cubic foot and by these methods and by the improved method herein described precipitated chalk of extreme lightness can be produced, in some cases having a weight as small as 12 pounds or less per cubic foot. The precipitation of the chalk under considerable pressure facilitates the combination of the carbon-dioxid with the lime and also in some cases improves the quality of the precipitated chalk produced. For this purpose the carbon-dioxid or gases containing the same and preferably rich in this precipitating element may be maintained at pressures of 60 to 80 pounds per square inch more or less, during the precipitating operation which may cut down the time of precipitation to 10 to 15 per cent. of the time required when the gases are at atmospheric pressure, so that in some cases the precipitation of the chalk may be accomplished in six or eight minutes. The use of compressed precipitating gases makes it possible not only effectively to spray or shower the lime liquor down through the carbonating chambers or tanks in which this action occurs, but also in some cases to secure good results by otherwise projecting the lime liquor through the precipitating gases as by the use of agitators which disseminate the liquor sufficiently to bring it intimately into contact with the precipitating medium during this step of the process.

The patent drawing shows in vertical section a somewhat diagrammatic representation of one form of apparatus which may be used for carrying out this process instead of the apparatus shown and described in my prior patent referred to. One or more carbonating chambers or tanks, such as 7, 8, may be used to effect this precipitation and they may be arranged in any suitable position and partly filled with lime liquor so that as indicated the liquor containing hydrated lime may fill the carbonating chamber to the extent of one-half to two-thirds of its volume, for instance. In order to reduce the size of the precipitating chambers the lime liquor may have a density as great as 30 to 35 degrees Twaddell, if desired, which also facilitates the subsequent filtration of the carbonate material, although when this consideration is not important lower concentrations, such as 10 to 15 degrees Twaddell may be used in some cases. A suitable gas supply pipe such as 12, may convey the compressed carbon-dioxid gas or flue gas or other gaseous medium containing carbon-dioxid to the carbonating chamber which may thus be maintained under the desired super atmospheric pressure of 20 to 100 pounds more or less per square inch to correspondingly hasten the precipitating operation. If desired, the gas may be compressed by a suitable compressor, such as 11, receiving the carbon-dioxid gas or mixture thereof, from the gas pipe 10 which may communicate with the washer 3 containing fragments of coke or other material 4 through which water or other liquid is sprayed from the sprayer head 5 to trickle or percolate through this washer and finally be discharged through the pipe 6. Gas rich in carbon-dioxid may, if desired, be supplied through the pipe 2 connected with a lime kiln 1 of any suitable description which is a convenient source of carbon-dioxid.

The lime liquor may be prepared in any suitable way so as to secure hydrated lime dissolved or more or less suspended in water and of the desired high purity which is specially important where extremely light precipitated chalk having a dry weight of 10 or 12 pounds per cubic foot is desired. If desired, a suitable hydrator, such as 13, may be used, the fully burned quicklime being, if desired, supplied to the perforated lime basket 17 more or less immersed in liquor within the hydrator tank which is kept agitated by the series of paddles or agitators 14 on the shaft 15 operated, if desired, by the gear 16. In slaking a fresh charge of lime additional water may, of course, be admitted to the agitator through the admission valve 21. The lime liquor may be pumped from the bottom of the agitator when the discharge valve 22 is opened so that this liquor may be forced by any suitable pump, such as 18, into the carbonating chamber or tank 7, and if desired sprayed down through the tank by a spray device or pipe 32 which disseminates the lime liquor and brings it intimately into contact with the precipitating gases which are preferably at high pressures so as to quickly and effectively precipitate the lime liquor and form calcium carbonate therefrom. If desired, the lime liquor may be repeatedly sprayed down through the carbonating chamber or tank 7 by the use of a circulating or spraying pump 28 drawing lime liquor from the bottom of the tank when the valve 29 is opened so as to force this liquor through the pipe 30 and valve 31 and thus spray or disseminate it throughout the gas space of the tank. This is not, however, necessary in all cases, since in many instances sufficient contact between the lime liquor and precipitating medium can be secured by a rotary agitator, such as a series of agitator paddles 35 mounted on the shaft 33 and driven at the desired speed by the pulley or wheel 34. In this way the lime liquor is continually picked up and more or less projected and disseminated throughout the gas space of the tank and brought into intimate contact with the precipitating gases which is sufficient in many instances to secure rapid and complete precipitation of the calcium carbonate especially when the precipitating process is effected under considerable super atmospheric pressure.

It is advantageous to effect a series precipitation of the lime liquor by the use of several carbonating tanks through which the lime liquor may pass in one direction while the precipitating gases pass from one tank to another in the opposite direction. For this purpose another carbonating chamber or tank 8 of similar construction may be used having, if desired, a similar agitator device driven by the pulley 40 and a similar spray device or pipe 38 by which the lime liquor may be sprayed or disseminated when the valve 37 is open and the circulating pump 18 operated so as to withdraw the lime liquor from the bottom of this tank 8 when the valve 23 is open and then force the liquor through the pipe 39 past the valve 37 and into the spray pipe 38, the valve 36 being preferably closed under these conditions. This carbonating tank may receive its carbonating gases through the pipe 41 connected through the valve 42 with the gas space in the carbonating chamber 7 so that the gas from which more or less of the carbon-dioxid has been removed in the chamber 7 may pass into the chamber 8 and exert such carbonating action as is possible on the fresh lime liquor. This partly carbonated lime liquor may then be forced into the final carbonating tank 7 to which the fresh carbon-dioxid gas is supplied so as to thus act to better effect in the final carbonating of the lime liquor.

When the carbonation has been sufficiently completed the contents of the carbonating tank may be discharged by opening the valve 24 in the discharge pipe 20 so that the calcium carbonate material may pass into any suitable type of filter device, such, for instance, as the vacuum filter 25 in which the greater part of the moisture may be removed and leave the precipitated chalk in moist condition in which it may be piled on trays or shelves and dried in any suitable form of drier, such as the oven drier 26 where the drying is preferably effected without substantial agitation of the material and at temperatures of 100 to 110 or 120 degrees C. which promotes, possibly because of the forcible evolution of steam throughout the mass of drying material, the light, fluffy condition of the dried material. The completely dried material may be disintegrated as in the disintegrator 27 breaking up the material into finely divided powdered form without undesirably or unnecessarily crushing its particles together so that in some cases the resulting finely powdered chalk may have a weight between 10 and 14 pounds per cubic foot.

This invention has been described in connection with a number of illustrative forms of apparatus, parts, proportions, ingredients, pressures, concentrations, duration, nature and order of steps, to the details of which disclosure the invention is not of course to be limited, since what is claimed as new and what is desired to be secured by Letters Patent is set forth in the appended claims:

1. The process of producing light precipitated chalk which comprises producing pure hydrated lime liquor having a density of between 25 and 35 degrees Twaddell, spraying such hydrated lime liquor through an atmosphere of gas rich in carbon-dioxid and under a pressure of about 60 to 80 pounds per square inch and in repeatedly projecting such lime liquor through such carbon-dioxid atmosphere to effect its conversion into finely divided chalk particles, filtering the converted liquor and drying the filtered chalk without substantial agitation and at temperatures between 110 and 120 degrees centigrade to promote its light condition.

2. The process of producing light precipitated chalk which comprises producing pure hydrated lime liquor having a density of between 25 and 35 degrees Twaddell, spraying such hydrated lime liquor through an atmosphere of gas rich in carbon-dioxid and under a pressure of over 40 pounds per square inch and in repeatedly projecting such lime liquor through such carbon-dioxid atmosphere to effect its conversion into finely divided chalk particles.

3. The process of producing light precipitated chalk which comprises producing pure hydrated lime liquor having a density of over 20 degrees Twaddell, disseminating and projecting such hydrated lime liquor through an atmosphere of gas rich in carbon-dioxid and under a pressure of over 40 pounds per square inch to effect its conversion into finely divided chalk particles.

4. The process of producing light precipitated chalk which comprises producing hydrated lime liquor of between 15 and 30 degrees Twaddell, projecting such hydrated lime liquor through an atmosphere of gas rich in carbon-dioxid and under pressure to effect its conversion into finely divided chalk particles, filtering the converted liquor, drying the filtered chalk without substantial agitation and at temperatures above 100 degrees centigrade to promote its light condition and disintegrating the dried chalk to produce finely powdered chalk, weighing between 10 and 16 pounds per cubic foot.

5. The process of producing light precipitated chalk which comprises producing hydrated lime liquor of over 10 degrees Twaddell, projecting such hydrated lime liquor through an atmosphere of gas rich in carbon-dioxid and under pressure to effect its conversion into finely divided chalk particles, filtering the converted liquor, drying the filtered chalk, and disintegrating the dried chalk to produce finely powdered chalk, weighing between 10 and 14 pounds per cubic foot.

6. The process of producing light precipitated chalk which comprises projecting hydrated lime liquor into contact with an atmosphere of gas containing carbon-dioxid and under a pressure of about 20 to 80 pounds per square inch, to effect its conversion into finely divided chalk particles, and filtering out and drying the produced chalk at temperatures above 100 degrees centigrade to promote its light condition.

7. The process of producing light precipitated chalk which comprises projecting hydrated lime liquor into contact with an atmosphere of gas containing carbon-dioxid and under super atmospheric pressure to effect its conversion into finely divided chalk particles, and filtering out and drying the produced chalk.

NOEL STATHAM.

Witnesses:
HENRY L. CONDIT,
ROBERT H. BUCKIE.